United States Patent
Yamani et al.

(10) Patent No.: US 10,023,813 B2
(45) Date of Patent: Jul. 17, 2018

(54) PROCESS FOR SELECTIVE DEEP HYDRODESULFURIZATION OF A HYDROCARBON FEEDSTOCK USING AN UNSUPPORTED NANOCATALYST MADE BY LASER PYROLYSIS

(71) Applicants: KING FAHD UNIVERSITY OF PETROLEUM AND MINERALS, Dhahran (SA); COMMISSARIAT A L'ENERGIE ATOMIQUE ET AUX ENERGIES ALTERNATIVES, Paris (FR)

(72) Inventors: Zain Hassan Yamani, Dhahran (SA); Nouar Tabet, Doha (QA); Syed Ahmed Ali, Dhahran (SA); Yann Leconte, Paris (FR); Frederic Schuster, Paris (FR); Axelle Quinsac, Paris (FR)

(73) Assignees: KING FAHD UNIVERSITY OF PETROLEUM AND MINERALS, Dhahran (SA); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/190,435

(22) Filed: Jun. 23, 2016

(65) Prior Publication Data
US 2017/0369792 A1 Dec. 28, 2017

(51) Int. Cl.
| | |
|---|---|
| B01J 27/047 | (2006.01) |
| B01J 37/20 | (2006.01) |
| C10G 45/08 | (2006.01) |
| B01J 27/051 | (2006.01) |
| B01J 35/00 | (2006.01) |
| B01J 35/02 | (2006.01) |
| B01J 37/08 | (2006.01) |
| C10G 45/04 | (2006.01) |
| B01J 37/34 | (2006.01) |
| C10G 45/00 | (2006.01) |

(52) U.S. Cl.
CPC ............ *C10G 45/08* (2013.01); *B01J 27/051* (2013.01); *B01J 27/0515* (2013.01); *B01J 35/0013* (2013.01); *B01J 35/023* (2013.01); *B01J 37/08* (2013.01); *B01J 37/082* (2013.01); *B01J 37/20* (2013.01); *B01J 37/34* (2013.01); *C10G 45/00* (2013.01); *C10G 45/04* (2013.01); *C10G 2300/202* (2013.01)

(58) Field of Classification Search
CPC .... B01J 27/047; B01J 35/0013; B01J 35/023; B01J 37/082; B01J 37/20
See application file for complete search history.

(56) References Cited

U.S. PATENT DOCUMENTS

| | | |
|---|---|---|
| 4,776,945 A | 10/1988 | Washecheck et al. |
| 2009/0107883 A1 | 4/2009 | Maesen et al. |
| 2009/0107886 A1 | 4/2009 | Maesen et al. |
| 2009/0107889 A1 | 4/2009 | Maesen et al. |
| 2009/0111655 A1 | 4/2009 | Maesen et al. |
| 2009/0111682 A1 | 4/2009 | Maesen et al. |
| 2009/0111683 A1 | 4/2009 | Zhan et al. |
| 2009/0111686 A1 | 4/2009 | Kuperman et al. |
| 2009/0112010 A1 | 4/2009 | Maesen et al. |
| 2009/0112011 A1 | 4/2009 | Maesen et al. |
| 2009/0145808 A1 | 6/2009 | Choi et al. |
| 2012/0000821 A1 | 1/2012 | Yang et al. |
| 2013/0068662 A1 | 3/2013 | Maesen et al. |

FOREIGN PATENT DOCUMENTS

| | | |
|---|---|---|
| WO | WO 95/09049 A2 | 4/1995 |
| WO | WO 2015/001520 A1 | 1/2015 |

OTHER PUBLICATIONS

E. Borsella et al., MoS2 Nanoparticles Produced by Laser Induced Synthesis From Gaseous Precursors, 20 J. Mater. Sci. Lett. 187-191 (2001).*

E. Boresella, et al., "MoS2 nanoparticles produced by laser induced synthesis from gaseous precursors" Journal of Materials Science Letters 20, 2001, pp. 187-191.

International Search Report and Written Opinion dated Oct. 27, 2017 in PCT/IB20171000947.

* cited by examiner

*Primary Examiner* — Randy Boyer
(74) *Attorney, Agent, or Firm* — Oblon, McClelland, Maier & Neustadt, L.L.P.

(57) ABSTRACT

A process for producing an unsupported molybdenum sulfide nanocatalyst comprising atomizing a molybdenum oxide solution to form a molybdenum oxide aerosol, pyrolyzing the molybdenum oxide aerosol with a laser beam to form the unsupported molybdenum-based nanocatalyst, and pre-sulfiding at least a portion of the unsupported molybdenum-based nanocatalyst to form an unsupported molybdenum sulfide nanocatalyst, wherein the unsupported molybdenum-based nanocatalyst, the unsupported molybdenum sulfide catalyst or both are in the form of nanoparticles with a diameter of 1-10 nm and in a distorted rutile crystalline structure. A method of selective deep hydrodesulfurization whereby a hydrocarbon feedstock having at least one sulfur-containing component and at least one hydrocarbon is contacted with the unsupported molybdenum sulfide nanocatalyst.

11 Claims, No Drawings

US 10,023,813 B2

PROCESS FOR SELECTIVE DEEP HYDRODESULFURIZATION OF A HYDROCARBON FEEDSTOCK USING AN UNSUPPORTED NANOCATALYST MADE BY LASER PYROLYSIS

STATEMENT OF ACKNOWLEDGEMENT

This project was funded by King Fahd University of Petroleum & Minerals and King Abdul-Aziz City of Science and Technology under project number AT-32-21.

BACKGROUND OF THE INVENTION

Technical Field

The present disclosure relates to a process for synthesizing an unsupported molybdenum-based nanocatalyst using laser pyrolysis and a process of using said material in the selective deep hydrodesulfurization of a hydrocarbon feedstock.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

New environmental regulations limit the sulfur content of gasoline and other petrochemical products to very low levels. These requirements necessitated development of new "deep desulfurization" nanocatalysts with high degrees of selectivity for high molecular weight sulfur-containing components [See Vergov, I. et al, 2009, "Catalyst Advances Promote Production of Near Zero Sulphur Diesel," *Nanotechnology* incorporated herein by reference in its entirety]. Promote Production of Near Zero Sulphur Diesel," *Nanotechnology* incorporated herein by reference in its entirety].

Sulfur-containing components occur naturally in almost all petroleum fractions. Additionally, higher boiling fractions, such as middle distillates, tend to contain greater quantities of high molecular weight sulfur materials. For example, middle distillates contain sulfides disulfides, thiophenes, benzothiophenes, and dibenzothiophenes. Conventional desulfurization catalysts are known to remove sulfides and thiophenes more easily than the higher molecular weight benzothiophenes and dibenzothiophenes. This results in petroleum products which routinely exceed new regulatory standards.

Nanocatalyst selectivity towards high molecular weight sulfur materials and the size of the nanocatalyst are known to be related. In particular, a nanocatalyst with nanoparticle diameters below 10 nm are believed to be ideally suited for targeting high molecular weight sulfur components [See Farag, H., 2004, "Investigation of 4,6-dimethyldibenzothiophene hydrodesulfurization over a highly active bulk $MoS_2$ catalyst," *Journal of Catalysis Today* incorporated herein by reference in its entirety].

Currently, commercial hydrodesulfurization nanocatalysts are synthesized by the in situ sulfiding of a molybdenum oxide nanomaterial on a support material and optionally in the presence of a promoter [See Chiyoda et al., and U.S. Pat. No. 6,063,265, incorporated herein by reference in its entirety]. Molybdenum oxides, such as molybdenum dioxide ($MoO_2$), nanomaterials which also exhibit promising catalytic properties can be formed by a variety of methods. Reducing $MoO_3$ with hydrogen or ethanol vapor [See Kerby, M. C., 2004, "Advanced catalyst technology and applications for high quality fuels and lubricants," *Catalysis Today* incorporated herein by reference in its entirety] volumetric flame synthesis, electrochemical deposition and hydrothermal synthesis have all also been performed [See Merchan, W., 2009, "Novel flame-gradient method for synthesis of metal oxide nanomaterials," *Nanotechnology* incorporated herein by reference in its entirety]. The resulting products include a variety of morphologies such as nanorods, nanowires, nanospheres, and nanoparticles. While different synthetic methods yield molybdenum oxide and molybdenum disulfide nanocatalysts with similar stoichiometries, the smallest dimensions of the reported $MoO_2$ and $MoS_2$ nanocatalysts were still larger than 10 nm. This can be attributed to a number of synthetic method conditions including, long reaction residence times, limited reaction precursors, oxidizing reaction conditions, and non-homogenous heating sources [See Stanislaus, A., 2010, "Recent advances in the science and technology of ultra low sulfur diesel (ULSD) production," *Catalysis Today* incorporated herein by reference in its entirety].

Therefore, the focus of this work is to provide a novel method for producing unsupported molybdenum sulfide and bimetallic molybdenum sulfide nanocatalysts with particle sizes less than 10 nm and a process of using thereof in deep hydrodesulfurization.

BRIEF SUMMARY OF THE INVENTION

According to a first aspect, the present disclosure relates to a process for synthesizing an unsupported molybdenum sulfide nanocatalyst comprising: i) atomizing a molybdenum oxide solution comprising at least one molybdenum precursor to form a molybdenum oxide aerosol, ii) pyrolyzing the molybdenum oxide aerosol with a laser beam having a wavelength of 1.0-30.0 μm, a laser beam power up to 1.2 kW, and a focal length intensity of 1-10 $kW/cm^2$ to form an unsupported molybdenum-based nanocatalyst, and iii) presulfiding at least a portion of the unsupported molybdenum-based nanocatalyst to form the unsupported molybdenum sulfide nanocatalyst, wherein the molybdenum oxide aerosol is pyrolyzed in the presence of a fluid carrier stream in a volumetric ratio of the molybdenum oxide aerosol to the fluid carrier stream ranging from 1:50 to 1:20, and the unsupported molybdenum-based nanocatalyst, the unsupported molybdenum sulfide catalyst or both are in the form of nanoparticles with a diameter of 1-10 nm and a distorted rutile crystalline structure.

In one embodiment, the at least one molybdenum precursor is molybdenum(IV) oxide bis(2,4-pentadionate).

In one embodiment, the molybdenum oxide solution has a concentration of molybdenum ranging from 0.04-0.2 M.

In one embodiment, the molybdenum oxide solution further comprises a metal precursor comprising at least one metal selected from the group consisting of Co, Ni, and W, and the process forms an unsupported mixed metal sulfide nanocatalyst comprising molybdenum and the at least one metal selected from the group consisting of Co, Ni, and W, wherein the unsupported mixed metal sulfide nanocatalyst is in the form of nanoparticles with a diameter of 1-10 nm and a distorted rutile crystalline structure.

In one embodiment, the metal precursor is cobalt(II) acetylacetonate.

In one embodiment, the molybdenum oxide solution comprises 1-30 wt % of the at least one metal, relative to the total weight of the molybdenum oxide solution.

In one embodiment, the molybdenum oxide aerosol is pyrolyzed at a flow rate of 4-12 m/s.

In one embodiment, the molybdenum oxide aerosol further comprises a photosensitizer selected from $NH_3$, $C_2H_4$, $SF_6$, $O_3$ and/or any combination thereof.

In one embodiment, the pre-sulfiding comprises contacting a gaseous mixture with the unsupported molybdenum-based nanocatalyst at an activating temperature of 250-400° C. for 1-8 hrs to form the unsupported molybdenum sulfide nanocatalyst wherein the gaseous mixture comprises $H_2$, and 1-10 mol % $H_2S$, relative to the total molar composition of the gaseous mixture.

In one embodiment, the pre-sulfiding comprises contacting a spiked hydrocarbon mixture and hydrogen gas with the unsupported molybdenum-based nanocatalyst for 12-20 hrs at 250-400° C. to form the unsupported molybdenum sulfide nanocatalyst, wherein the spiked hydrocarbon mixture comprises 1-5% dimethyl disulfide by weight relative to the total weight of the spiked hydrocarbon mixture, and a liquid hydrocarbon with hydrogen gas, and the unsupported molybdenum-based nanocatalyst, wherein a hydrogen gas pressure is 2-10 MPa.

According to a second aspect, the present disclosure relates to a process for synthesizing an amorphous molybdenum sulfide nanocatalyst comprising: (i) atomizing a molybdenum oxide solution comprising at least one molybdenum precursor and thiouric acid to form an amorphous molybdenum-based aerosol, and (ii) pyrolyzing the amorphous molybdenum-based aerosol with a laser beam having a wavelength of 1.0-30.0 μm, a laser beam power up to 1.2 kW, and a focal length intensity of 1-10 kW/cm² to form an amorphous molybdenum sulfide nanocatalyst, wherein the amorphous molybdenum sulfide nanocatalyst does not have a crystalline structure.

According to a third aspect, the present disclosure relates to a continuous process for deep hydrodesulfurization of a hydrocarbon feedstock comprising: (i) contacting a hydrocarbon feedstock comprising at least one sulfur-containing component and at least one hydrocarbon component with an unsupported mixed metal sulfide nanocatalyst in the presence of hydrogen gas to convert 90-99.8% by weight of the at least one sulfur-containing component into hydrogen sulfide and to form a treated hydrocarbon, and (ii) removing the hydrogen sulfide from the treated hydrocarbon to form a purified hydrocarbon, wherein the contacting is performed for 36-100 hours at a temperature ranging from 250-400° C., a hydrocarbon feedstock flow rate ranges from 5-15 mL/h, the unsupported mixed metal sulfide nanocatalyst is in the form of a pellet with a diameter of 0.20-2.00 mm, made of nanoparticles with a diameter of 1-10 nm and comprises molybdenum and at least one metal selected from the group consisting of Co, Ni, and W.

In one embodiment, the at least one metal is Co and the unsupported mixed metal-based nanocatalyst has a Co:Mo molar ratio of 10:1 to 1:10, and a Co content of 1-30% by weight relative to the total weight of the unsupported mixed metal sulfide nanocatalyst.

In one embodiment, the hydrocarbon feedstock is a light gas oil.

In one embodiment, the hydrocarbon feedstock sulfur content is 0.05-10% by weight relative to the total weight of the hydrocarbon feedstock.

In one embodiment, the at least one sulfur-containing component is selected from the group consisting of a sulfide, a disulfide, a thiophene, a benzothiophene, a dibenzothiophene, and/or any combination thereof.

In one embodiment, the unsupported mixed metal sulfide nanocatalyst is mixed with silicon carbide in a 1:10 to 10:1 ratio by weight prior to the contacting.

In one embodiment, a volumetric ratio of $H_2$/hydrocarbon feedstock is 200-300 NL/L.

In one embodiment, a hydrogen flow rate is 1.5-3.0 NL/h.

In one embodiment, the sulfur content of the purified hydrocarbon is 90-99.8% by weight less than the sulfur content of the hydrocarbon feedstock.

DETAILED DESCRIPTION OF THE EMBODIMENTS

According to a first aspect, the present disclosure relates to a process for synthesizing unsupported molybdenum sulfide nanocatalyst comprising atomizing a molybdenum oxide solution comprising at least one molybdenum precursor to form a molybdenum oxide aerosol.

"Atomizing", as used herein, refers to any process where components distributed in a fluid phase traversing a high to low pressure gradient to produce smaller component units/droplets.

In one embodiment, the atomizing may comprise injecting the molybdenum oxide precursor solution into an atomizing unit comprising a fluid carrier stream to produce a molybdenum oxide aerosol.

"Injecting", as used herein, refers to any process of rapidly introducing a precursor into a continuously or periodically flowing fluid carrier stream to form a combined precursor stream, such as the molybdenum oxide aerosol.

The molybdenum oxide solution, as used herein, refers to a mixture comprising at least one molybdenum precursor in an appropriate solvent. The molybdenum precursor solution may include by moles a molybdenum precursor concentration of 0.02-0.5 M, preferably 0.03-0.2 M, more preferably 0.04-0.1 M.

A molybdenum precursor, as used herein, may refer to any molybdenum salt, molybdenum coordination complex, molybdenum acid, molybdenum base and/or any combination thereof that is soluble in an appropriate solvent and comprises at least one molybdenum metal ion. Exemplary molybdenum precursors include, but are not limited to, molybdenum nitrates, molybdenum halides, molybdenum acetates, molybdenum carbonates, molybdenum carboxylates, molybdenum ketones and/or any combination thereof. In one embodiment, the molybdenum precursor is molybdenum(IV) oxide bis(2,4-pentadionate).

An appropriate solvent may also be selected from but not limited to deionized water, alcohols, such as methanol, ethanol, isopropyl alcohol, n-butanol, acids, such as acetic acid, and formic acid, nitromethane and/or any combination thereof.

More than one metal precursor may be added to the molybdenum oxide solution in order to produce a mixed metal oxide aerosol. Similar to the molybdenum precursor disclosed herein, a metal precursor may be any salt, coordination complexes, acid, bases and/or any combination thereof that is soluble in a polar solvent and comprises at least one metal ion selected from the group consisting of Co, Ni, W and/or any combination thereof.

In one embodiment, the at least one metal is 1-30%, preferably at least 1%, up to 2%, up to 3%, up to 4%, up to 5%, up to 6%, up to 7%, up to 8%, up to 9%, up to 10%, up to 11%, up to 12%, up to 13%, up to 14%, up to 15%, up to 16%, up to 17%, up to 18%, up to 19%, up to 20%, up to 30% of the molybdenum oxide solution by weight.

In one embodiment, the molybdenum oxide precursor solution further comprises a metal precursor wherein the metal precursor includes Co metal to form a mixed metal oxide aerosol and wherein an unsupported mixed metal-based nanocatalyst, an unsupported mixed metal sulfide nanocatalyst, or both are produced. In another embodiment, the metal precursor is cobalt(II) acetylacetonate.

The fluid carrier stream may be a gas flow, a liquid flow and/or both originating from an external or internal source relative to the atomizing unit which are well known by those skilled in the art.

A typical atomizing unit may include at least one fluid carrier stream source fluidly connected to an injection inlet which is connected to an atomizing reaction zone, and at least one outlet. Exemplary fluid carrier streams may include, but are not limited to, gases, such as compressed air, inert gases such as helium, nitrogen, and argon, liquids, such as deionized water, alcohols such as isoproproxyethanol, ethanol, butanol, isopropyl alcohol, diacetone alcohol, glycols, such as, carbitols, diglycols, triglycols, glycol ethers, acetone, methylethylketone, ethoxy-, propoxy-, isopropoxy-, butoxyethanol-acetate esters, glycolesters, ethyl acetate, butyl acetate, butoxyethyl acetate, alkanes, toluene, xylene, acrylic acid, methacrylic acid, acrylate, methacrylate monomers, and/or any combination thereof. In one embodiment, the atomizing unit is an ultrasonic generator which is well known by those skilled in the art. In another embodiment, the fluid carrier stream is an inert gas.

Upon entering the atomizing reaction zone the molybdenum oxide solution is "pressurized" by passing it through an injection nozzle. The injection nozzle diameter may be 50-300 μm, preferably 75-250 μm, more preferably 100-200 μm and yields a molybdenum oxide aerosol at a flow rate of 10-1000 sccm, preferably 25-750 sccm, more preferably 40-600 sccm.

In one embodiment, a volumetric ratio of the molybdenum oxide aerosol to the fluid carrier stream may be 1:50 to 1:20, preferably 1:45 to 1:25, and more preferably 1:40 to 1:30.

In one embodiment, the pressure experienced by the molybdenum oxide solution during the atomizing may be 0.01-10 MPa, preferably 0.01-5 MPa, more preferably 0.01-2 MPa.

The present disclosure also describes pyrolyzing the molybdenum oxide aerosol in a pyrolysis reactor with a laser beam having a wavelength of 1.0-30.0 μm, a laser beam power source up to 1.2 kW, and a focal length intensity of 1-10 $kW/cm^2$ to form the molybdenum-based nanocatalyst.

"Pyrolyzing", as used herein, refers to any process where at least one reagent is rapidly raised to a reaction temperature using a laser beam with a sufficient wavelength to decompose the at least one reagent into more thermodynamically stable units and/or products.

A laser pyrolysis reactor may include a reaction chamber, a laser beam source and an associated optical element, such as a window, configured to deliver a laser beam into the reaction chamber, a reactant delivery system comprising an inert gas source, reactant reservoirs, and at least one inlet nozzle configured to deliver one or more reactants via a fluid stream from the reactant delivery system into the reaction chamber, and a collection system configured to receive a product flow from the reaction chamber originating from the at least one inlet nozzle.

The laser beam source may include any type of lasing medium which are well known by those skilled in the art. Exemplary lasing mediums include gases, such as $CO_2$, He—Ne, nitrogen, helium-copper, and neon-copper, chemical lasers, such as oxygen-iodine (COIL), all-gas-phase iodine (AGIL), hydrogen-fluoride (HF), and deuterium-fluoride (DF), excimers such as, $Ar_2$*, $Kr_2$*, $F_2$*, $Xe_2$*, ArF, KrF XeBr, XeCl, XeF, and KrCl, solid state materials such as Ruby, ND:YAG, Er:YAG, Nd:YLF, Nd:$YVO_4$, Nd:YCOB, Nd:Glass, Ti:Sapphire, Tm:YAG, Yb:YAG, Yb:$O_3$, Yb:Glass, Ho:YAG, Cr:ZnSe, Ce:LiSAF, Ce:LiCAF, $^{147}Pm^{3+}$:Glass, chromium doped chroberyl, Er—Yb:Glass, Er:Glass U:$CaF_2$, Sm:$CaF_2$, and F-Center, semiconductors, such as GaN, InGaN, AlGaInP, AlGaAs, InGaAsP, VCSEL, Quantum Cascade, Hybrid Silicon, free electron lasers, photonic crystals, and dyes, such as rhodamine, fluorescein, coumarin, stilbene, umbelliferone, tetracene, and malachite green. In one embodiment, the laser beam source is a $CO_2$ laser.

A typical pyrolyzing may include flowing a reaction stream which may include the molybdenum oxide aerosol, the mixed metal oxide aerosol or both, a fluid carrier stream, a photosensitizer, and/or any combination thereof, through an inlet nozzle with a diameter of 0.1-5.0 cm at a flow rate of 4-12 m/s, into the laser pyrolysis reactor, contacting at least a portion of the reaction stream with the laser beam of a sufficient wavelength, and focal length intensity to rapidly decompose the reaction stream over a residence time of 0.1-1.0 ms to form the unsupported molybdenum-based nanocatalyst, the unsupported mixed metal-based nanocatalyst or both and cooling the respective nanocatalyst to terminate the pyrolyzing.

Pyrolyzing the molybdenum oxide aerosol, the mixed metal oxide aerosol or both, may require a photosensitizer to absorb the laser beam's energy at a given wavelength. Photosensitizers which are well known by those skilled in the art may be selected from the group consisting of $NH_3$, $C_2H_4$, $SF_6$, $O_3$ and/or any combination thereof.

The volumetric ratio of the metal oxide aerosol to the fluid carrier stream may be from 1:50 to 1:20, preferably 1:45-1:25, more preferably 1:40-1:30.

A sufficient laser beam wavelength may be 1.0-30.0 μm, preferably 5-25 μm, preferably 8-20 μm, more preferably 9-15 μm or 10-12 μm.

"Focal length intensity", as used herein, refers to a measure of power for collimated rays brought into focus (such as a laser beam) and with respect to distance. The focal length intensity of the laser beam described herein may be 1-10,000 $kW/cm^2$, preferably 1.5-6.0 $kW/cm^2$, more preferably 2.0-5.0 $kW/cm^2$.

The present disclosure describes pre-sulfiding at least a portion of the unsupported molybdenum-based nanocatalyst, the unsupported mixed metal-based catalyst, or both, to form an unsupported molybdenum sulfide nanocatalyst, and/or an unsupported mixed metal sulfide nanocatalyst wherein the unsupported molybdenum sulfide nanocatalyst, the unsupported mixed metal sulfide nanocatalyst or both are in the form of nanoparticles with a diameter less than 10 nm and a distorted rutile crystalline structure.

"Unsupported", as used herein, refers to a catalytic material that includes by weight less than 5%, preferably less than 4%, preferably less than 3%, preferably less than 2%, more preferably less than 1% of a support material to increase the surface area exposed during a catalytic reaction.

Support materials are well known by those skilled in the art and are commonly selected from the group consisting of various kinds of carbon, alumina, silica, silica-alumina (including conventional silica-alumina, silica-coated alumina, and alumina-coated silica), titania, zirconia, cationic clays or anionic clays such as saponite, bentonite, kaoline, sepiolite or hydotalcite, and the like.

"Pre-sulfiding", as used herein, refers to any process where a catalytic material is exposed to a sulfiding agent to increase the catalytic activity of the catalyst material or to attenuate the catalytic properties of the catalyst (e.g. change the selectivity properties or the activity of the catalyst).

The sulfiding agent, as used herein, may be selected from the group consisting of but not limited to $H_2S$, carbon disulfide, dimethyl disulfide, ethyl disulfide, propyl disulfide, isopropyl disulfide, butyl disulfide, tertiary butyl disulfide, thianaphthene, thiophene, secondary dibutyl disulfide, thiols, sulfur-containing hydrocarbon oils and sulfides such as methyl sulfide, ethyl sulfide, propyl sulfide, isopropyl sulfide, butyl sulfide, secondary dibutyl sulfide, tertiary butyl sulfide, dithiols, sulfur-bearing gas oils and/or any combination thereof. Additionally, other organic sulfur sources that can be converted to $H_2S$ over the catalytic material and in the presence of hydrogen can be used.

A sulfiding agent mixture, as used herein, refers to a mixture in gaseous, vapor, liquid or solid form, and comprises at least one sulfiding agent, and a medium selected from but not limited to, gases, such as $H_2$, Ar, $N_2$, and He, cyclic alkanes, such as cyclohexane, cycloheptane, cyclooctane, cyclononane, and cyclodecane, and polycyclic alkanes such as bicyclo[2,2,1]heptane (or norbornane), bicyclo[2,2,2]octane, octahydro-1H-indenane, and decahydronaphthalene.

A pre-sulfiding process may include contacting at least one sulfiding agent with the unsupported molybdenum-based nanocatalyst, the unsupported mixed metal-based nanocatalyst or both at a liquid hourly space velocity of 0.5-8, preferably 0.75-6, more preferably 1-4, an activating temperature of 250-400° C., preferably 275-375° C., more preferably 300-350° C., and in the presence of hydrogen gas with a pressure of 2-10 MPa, preferably 3-8 MPa, more preferably 2-6 MPa, for 0.5-48 hrs, preferably 0.75-24 hrs, more preferably 1-20 hrs, to form the molybdenum sulfide nanocatalyst, the mixed metal sulfide nanocatalyst, or both.

In one embodiment, the pre-sulfiding comprises contacting the unsupported molybdenum-based nanocatalyst, at an activating temperature of 250-400° C. with a first sulfiding agent mixture for 1-8 hrs to form the unsupported molybdenum sulfide nanocatalyst wherein the sulfiding agent mixture comprises $H_2$ and 1-10 mol % $H_2S$, relative to the total molar composition of the first sulfiding agent mixture.

In another embodiment, the sulfiding agent mixture is a spiked hydrocarbon mixture. The pre-sulfiding comprises contacting a spiked hydrocarbon mixture at an activating temperature of 250-400° C. with hydrogen gas, and the unsupported molybdenum-based nanocatalyst for 12-20 hrs, to form the unsupported molybdenum sulfide nanocatalyst, wherein the spiked hydrocarbon mixture comprises 1-5% dimethyl disulfide by weight relative to the total weight of the spiked hydrocarbon mixture and a liquid hydrocarbon, wherein the hydrogen gas is at a pressure of 2-10 MPa. The liquid hydrocarbon comprises hydrocarbons with 6-16 carbon atoms per hydrocarbon, may be red kerosene or white kerosene, and the grade of kerosene may be K1 or K2. Preferably, the liquid hydrocarbon is white kerosene. More preferably, a K1 white kerosene is used.

The pre-sulfiding may occur outside (ex situ) or inside (in situ) a hydrodesulfurization reactor's reaction zone, wherein the sulfiding agent, sulfiding agent mixture or both may be in a gaseous, liquid, or vapor form.

In one embodiment, the nanocatalyst is sulfided during the contacting so as to maintain the catalyst in a sulfided form. In this scenario, the catalyst may be in a non-sulfided form such as the unsupported molybdenum-based nanocatalyst, the unsupported mixed metal-based nanocatalyst, or both, and may be pre-sulfided by adding a sulfiding agent/sulfiding agent mixture to the hydrocarbon feed.

All products formed (i.e. the unsupported molybdenum-based nanocatalyst, the unsupported molybdenum sulfide nanocatalyst, the unsupported mixed metal-based nanocatalyst, and the unsupported mixed metal sulfide nanocatalyst) are in the form of nanoparticles with a diameter of 1-10 nm, preferably 2-9 nm, more preferably 3-8 nm.

Alternatively, it can be envisioned where any of the nanocatalyst described herein may be formed as nanospheres, core shell nanoparticles, nanorods, nanoplatelets, nanoshells, and/or any combination thereof.

Any of the nanocatalyst disclosed herein unless otherwise noted may include, but not limited to, a crystalline phase selected from the group consisting of rutile, anatase, brookite, hexagonal, and distorted rutile. In one embodiment, the unsupported molybdenum-based nanocatalyst, the unsupported molybdenum sulfide nanocatalyst, the unsupported mixed metal-based nanocatalyst, the unsupported mixed metal sulfide nanocatalyst and/or any combination thereof are in a distorted rutile crystalline structure. In another embodiment, the unsupported molybdenum-based nanocatalyst, the unsupported molybdenum sulfide nanocatalyst, the unsupported mixed metal-based nanocatalyst, the unsupported mixed metal sulfide nanocatalyst and/or any combination thereof are in a hexagonal crystalline structure.

The distorted rutile crystal structure, as used herein, refers to crystal phase comprising a body centered tetragonal unit cell, wherein the metal ions (e.g. Mo, Co, Ni and W) within the structure have a coordination number of 6 while the oxygen and/or sulfur atoms have a coordination number of 3.

According to a second aspect, the present disclosure relates to a process for synthesizing an amorphous molybdenum sulfide nanocatalyst comprising: (i) atomizing a molybdenum oxide solution comprising at least one molybdenum precursor and thiouric acid to form an amorphous molybdenum-based aerosol, and (ii) pyrolyzing the amorphous molybdenum-based aerosol with a laser beam to form an amorphous molybdenum sulfide nanocatalyst. The abovementioned atomizing and pyrolysis conditions are employed to synthesize the amorphous molybdenum sulfide nanocatalyst. An amount of thiouric acid in the molybdenum oxide solution ranges from 0.01-10 wt %, preferably 0.1-5 wt %, more preferably 1-3 wt % of the total weight of the molybdenum oxide solution. In another embodiment, an amorphous unsupported mixed metal sulfide nanocatalyst is prepared by including thiouric acid in the molybdenum oxide solution comprising the at least one metal precursor.

"Amorphous", as used herein, refers to lacking a crystalline structure.

According to a third aspect, the present disclosure relates to a continuous process for deep hydrodesulfurization of a hydrocarbon feedstock comprising: (i) contacting a hydrocarbon feedstock comprising at least one sulfur-containing component and at least one hydrocarbon component with an unsupported mixed metal sulfide nanocatalyst in the presence of hydrogen gas to convert 90-99.8% by weight of the at least one sulfur-containing component into hydrogen sulfide and to form a treated hydrocarbon, and (ii) removing the hydrogen sulfide from the treated hydrocarbon to form a purified hydrocarbon, wherein the contacting is performed for 36-100 hours at a temperature ranging from 250-400° C., a hydrocarbon feedstock flow rate ranges from 5-15 mL/h, the unsupported mixed metal sulfide nanocatalyst is in the form of a pellet with a diameter of 0.20-2.00 mm, made of nanoparticles with a diameter of 1-10 nm and comprises molybdenum and at least one metal selected from the group consisting of Co, Ni, and W.

The process disclosed herein may be conducted as a batch or continuous process. "Continuous", as used herein, refers to a process or method used to manufacture materials, produce materials, process materials and/or any combination thereof, without interruption or where the reactants are flowed and/or are in motion during a chemical reaction.

"Deep hydrodesulfurization", as used herein, may refer to any process where a hydrocarbon feedstock comprising at least one sulfur-containing component and a total sulfur content of less than 10% by weight is reacted with at least one catalyst and in the presence of hydrogen gas to at least partially convert the sulfur-containing components into hydrogen sulfide leaving behind a hydrocarbon product with a sulfur content less than 35 ppm by weight.

The hydrocarbon feedstock, as used herein, may be selected from but is not limited to, mineral oil, raw pyrolysis gasoline (RPG), hydrotreated pyrolysis gasoline, reformate, heavy aromatics, kerosene, jet oil, atmospheric gas oil, residue fluid catalytic cracking (RFCC) gasoline, fluid catalytic cracking (FCC) gasoline, light cracked naphtha, RFCC heavy naphtha, FCC decanted oil, vacuum gas oil, coker gas oil, coker diesel, coker naphtha, heavy and reduced petroleum crude oil, petroleum atmospheric distillation bottom, petroleum vacuum distillation bottom, asphalt, bitumen, tar sand oil, shale oil, liquid/solid products obtained by coal liquefaction or coal carbonation including coal tar, tar oil, light cycle oil (LCO), phenolic oil, light anthracene oil, heavy anthracene oil, and pitch, products derived from wood carbonation such as wood tar, hardwood tar, resinous tar, and any combinations thereof.

In one embodiment, the hydrocarbon feedstock is light gas oil.

The hydrocarbon feedstock may include a sulfur-containing component content of 0.05-10%, preferably at least 0.05%, at least 0.1%, at least 1%, at least 3%, at least 5%, at least 6%, at least 7%, at least 8%, at least 9% by weight and no more than 10% by weight, relative to the total weight of the hydrocarbon feedstock. In one embodiment, the hydrocarbon feedstock sulfur-containing component content is at least 1% by weight relative to the total weight of the hydrocarbon feedstock.

In one embodiment, the hydrocarbon feedstock is a middle distillate from a Saudi Arabian medium crude oil (AM-LGO) with a sulfur content by weight of 100-100,000 ppm, preferably 500-50,000 ppm, more preferably 500-10,000 ppm, relative to the total hydrocarbon feedstock component content.

Exemplary sulfur-containing components include but are not limited to $H_2S$, elemental sulfur, carbon disulfide, dimethyl disulfide, ethyl disulfide, propyl disulfide, isopropyl disulfide, butyl disulfide, tertiary butyl disulfide, thianaphthene, thiophene, secondary dibutyl disulfide, thiols, methyl mercaptan, phenyl mercaptan, cyclohexythiol, methyl sulfide, ethyl sulfide, propyl sulfide, isopropyl sulfide, butyl sulfide, secondary dibutyl sulfide, tertiary butyl sulfide, benzothiophene, dibenzothiophene, alkyl benzothiophene, alkyl dibenzothiophene, thiocyclohexane, and/or any combination thereof.

In one embodiment, the at least one sulfur-containing component is selected from the group consisting of a sulfide, a disulfide, a thiophene, a benzothiophene, a dibenzothiophene, thia-3,4-benzofluorene, tetraphenylthiophene, diacenaphtho (1,2-b, 1',2'-d) thiophene, anthra (2,1,9-cde) thionaphthene and/or any combination thereof.

The hydrocarbon component may be at least one selected from the group consisting of but not limited to $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, and $C_{16+}$ containing compounds such as ethane, propane, butane, isobutane, pentane, hexane, heptane, octane, nonane, decane, undecane, dodecane, tridecane, tetradecane, pentadecane, hexadecane, as well as isomers and derivatives (e.g. unsaturated derivatives) thereof.

The hydrocarbon feedstock may also contain aromatic hydrocarbon compounds, such as benzene, styrene, xylene, toluene, ethyl benzene, indene, naphthalene, phenanthrene, anthracene, biphenyl, alkyl benzenes, as well as derivatives thereof.

Hydrocarbon feedstocks are typically described by a boiling/volatility range. In one embodiment, a light gas oil from a Saudi Arabian medium crude feedstock includes a boiling point range under 1 atmosphere of 165-400° C., preferably 175-375° C., more preferably 180-360° C.

Boiling point ranges may vary between feedstocks largely due to regionally defined differences in composition and extraction methods, and as a result may produce different output products when undergoing the hydrodesulfurization process.

A hydrodesulfurization unit may comprise a preheating zone, optionally fluidly connected to at least one hydrodesulfurization reactor. The at least one hydrodesulfurization reactor may include at least one stage, preferably at least two stages, more preferably at least three stages composing at least one bed/layer of a hydrodesulfurization catalyst, with at least one quenching zone optionally separating the stages.

As previously disclosed herein, the metal (in addition to molybdenum) in the unsupported mixed metal sulfide nanocatalyst may be selected from the group consisting of Ni, W and Co.

In one embodiment, the at least one metal is Co, forming an unsupported cobalt/molybdenum sulfide nanocatalyst (CoMoS).

Alternatively, it can be envisioned where the unsupported mixed metal sulfide nanocatalyst may be combined with a support material or a derivative described herein.

In one embodiment, the CoMoS nanocatalyst is diluted in a 1:10 to 10:1 ratio by weight with silicon carbide, a diluent, prior to the contacting. The size of the silicon carbide ranges from 40-300 mesh, preferably 40-200 mesh, more preferably 80-120 mesh.

CoMoS nanoparticle diameters may be 1-10 nm, preferably up to 2 nm, up to 3 nm, up to 4 nm, up to 5 nm, up to 6 nm, up to 7 nm, up to 8 nm, up to 9 nm, or up to 10 nm, more preferably 3-9 nm, 4-8 nm, or 5-7 nm. In one embodiment, a molar ratio of Co:Mo for the CoMoS nanocatalyst is 10:1 to 1:10, 9:1 to 1:9, 8:1 to 1:8, 7:1 to 1:7, 6:1 to 1:6, 5:1 to 1:5, 4:1 to 1:4, 3:1 to 1:3, 2:1 to 1:2, or 1:1.

The Co content of the CoMoS nanocatalyst by weight may be 1-30%, or at least 1% and up to 2%, up to 3%, up to 4%, up to 5%, up to 6%, up to 7%, up to 8%, up to 9%, up to 10%, up to 15%, up to 20%, up to 25%, or up to 30%, relative to the total weight of the CoMoS nanocatalyst.

In one embodiment, a pellet of the CoMoS nanocatalyst is 0.20-2.00 mm in diameter, preferably 0.25-1.50 mm, preferably 0.35-1.25 mm, more preferably 0.45-1.00 mm, more preferably 0.50-0.85 mm.

In one embodiment, the unsupported mixed metal sulfide nanocatalyst may be present in a reactor in the form of a bed or a layer, and the unsupported catalyst may be moving, fluidized, or preferably fixed.

The disclosed process advantageously involves catalyst activation. The CoMoS nanocatalyst may be activated prior to entering the hydrodesulfurization reaction zone or while inside the reaction zone. In one embodiment, the CoMoS nanocatalyst is activated within the hydrodesulfurization reactor at temperature of 250-400° C. for 8-48 hrs, preferably 10-24 hrs, more preferably 12-20 hrs to form the activated CoMoS prior to the contacting.

An exemplary contacting may include preheating the hydrocarbon feedstock in a preheating zone to a sufficient temperature of at least 250° C., and reacting the preheated hydrocarbon feedstock with the at least one bed/layer of activated CoMoS nanocatalyst, in the presence of a hydrogen gas flow with a reactor pressure range of 1-10 MPa, preferably 2-9 MPa, more preferably 3-7 MPa in order to convert the sulfur-containing components into hydrogen sulfide, forming a treated hydrocarbon.

In one embodiment, the hydrocarbon feedstock may be in a vapor phase, a liquid phase and/or any combination thereof, upon entering the at least one reaction stage.

In another embodiment, a volumetric ratio of $H_2$/hydrocarbon feedstock is 200-300 NL/L, preferably 225-275 NL/L, more preferably 245-255 or 250 NL/L.

While it may be advantageous to use a volumetric ratio of hydrogen gas to the hydrocarbon feedstock that is about 1, the use of a higher ratio (i.e. increased amount of hydrogen), may still be utilized and the process will still proceed as intended. In one or more embodiments, hydrogen gas that exits the reactor after the contacting may be recirculated back into the reactor, after appropriate separation of the hydrogen gas from the hydrocarbon product stream.

In one embodiment, a hydrogen flow rate is 1.5-3.0 NL/h preferably at least 1.5 NUh, at least 2.0 NL/h, at least 2.5 NL/h, or no more than 3.0 NL/h.

In one embodiment, the contacting converts by weight 90-99.8%, preferably at least 90%, at least 91%, at least 92%, at least 93%, at least 94%, at least 95%, at least 96%, at least 97%, at least 98%, at least 99% of the sulfur-containing component(s) present in the hydrocarbon feedstock into hydrogen sulfide.

A "sufficient temperature", as used herein, refers to a reactor temperature at which the hydrodesulfurization reaction is initiated on the hydrocarbon feedstock. In one embodiment, the sufficient temperature may be 250-400° C., preferably 275-375° C., more preferably 300-365° C., or 250-255° C., 250-260° C., 250-265° C., 250-270° C., 250-275° C., 250-280° C., 275-285° C., 275-290° C., 275-295° C., 275-300° C., 300-305° C., 300-310° C., 300-315° C., 300-320° C., 300-325° C., 300-330° C., 300-335° C., 300-340° C., 300-345° C., 300-350° C., 300-355° C., or 300-360° C.

The present disclosure includes removing the hydrogen sulfide from the treated hydrocarbon in the presence of a nitrogen stream to form a purified hydrocarbon.

"Removing", as used herein, may refer to any process of separating, at least one component from a mixture. Exemplary removing processes include but are not limited to distillation, absorption, adsorption, solvent extraction, stripping or filtration and are well known by those skilled in the art. An exemplary removing involves the treated hydrocarbon comprising hydrogen sulfide, excess hydrogen, and/or both being passed from the hydrodesulfurization reactor into the separating zone comprising a stripper at a temperature range of 60-400° C. and being divided into the purified hydrocarbon and a sour gas stream comprising hydrogen sulfide.

In one embodiment, the sulfur content of the purified hydrocarbon is by weight 90-99.8%, preferably at least 90%, at least 91%, at least 92%, at least 93%, at least 94%, at least 95%, at least 96%, at least 97%, at least 98%, at least 99% less than the sulfur content of the hydrocarbon feedstock.

In another embodiment, the purified hydrocarbon includes a total sulfur-containing component content of less than 35 ppm, preferably less than 34 ppm, preferably less than 33 ppm, preferably less than 32 ppm, preferably less than 31 ppm, preferably less than 30 ppm, preferably less than 29 ppm, preferably less than 28 ppm, preferably less than 27 ppm, preferably less than 26 ppm, preferably less than 25 ppm, preferably less than 24 ppm, preferably less than 23 ppm, preferably less than 22 ppm, preferably less than 21 ppm, preferably less than 20 ppm, preferably less than 19 ppm, preferably less than 18 ppm, preferably less than 17 ppm, preferably less than 16 ppm, preferably less than 15 ppm, preferably less than 14 ppm, preferably less than 13 ppm, preferably less than 12 ppm, preferably less than 11 ppm, preferably less than 10 ppm by weight, relative to the total weight of the purified hydrocarbon.

In one embodiment, the purified hydrocarbon may include a mid-boiling point range of 240-265° C., preferably 245-260° C., more preferably 250-255° C.

The examples below are intended to further illustrate protocols for preparing and using the unsupported nanocatalyst for selective deep hydrodesulfurization. Further they are intended to illustrate assessing these catalytic materials for selective hydrodesulfurization in the presence of different sulfur-containing components prolonged catalyst exposure times described herein, and are not intended to limit the scope of the claims.

Example 1

A suitable precursor for the molybdenum and cobalt can be selected from a range of molybdenum compounds for the synthesis of $MoO_2$ and CoO nanocatalysts. Molybdenum (VI) oxide bis(2,4-pentanedionate) (MOP) is a preferred molybdenum precursor due to its good solubility in ethanol. The precursor, which is soluble in ethanol, can be decomposed easily under the laser beam. Similarly, a suitable precursor for the Co can be selected from a range of cobalt compounds. Cobalt(II) acetylacetonate $[Co(C_2H_5O)_2]$ was used for cobalt source. In a typical synthesis of $MoO_2$, 10-20 g MOP precursor was dissolved in 200-600 ml ethanol. The preferred amount of MOP is 15-17 g and the preferred amount of ethanol is 300-400 ml. After stirring with an electromagnetic stirrer, the solution was introduced into the pyrolysis reactor as an aerosol produced by ultrasonic generator. Pyrolysis conditions were chosen in order to ensure a good decomposition of the precursor together with a low contamination of carbon. The crystallized $MoO_2$ and Co/$MoO_2$ nanoparticles with the dimension less than 6-10 nm are synthesized by laser pyrolysis in one step process. The obtained nanoparticles are quite different from the ones obtained with previous direct synthesis in which the precursor was soluble in water leading to the formation of large nanostructured hollow spheres.

Example 2

SCoMo1 nanocatalyst was prepared using the method described in Example 1. It was subjected to hydrodesulfurization performance evaluation test in a batch reactor using thiophene and dibenzothiophene as model sulfur compounds. A small-scale batch autoclave reactor (laboratory stirred reactor) with a capacity of 100 ml was used. A 50 g model feedstock was prepared by adding 0.13 g of thiophene in 49.87 g of decalin (inert hydrocarbon) so as to have a sulfur content of 1,000 ppm. Another 50 g model feedstock was prepared by adding 0.29 g of dibenzothiophene in 49.71 g of decalin so as to have a sulfur content of 1,000 ppm. The experiments were carried out with 0.2 g of nanocatalysts whereas comparative experiments with commercially used conventional $CoMo/Al_2O_3$ (referred to as "reference" catalyst) were carried out with 0.5 g catalyst.

The reactor was pressurized by hydrogen and heated. The target reaction temperature was 325° C. When this temperature is reached, the hydrogen pressure is adjusted to the targeted value of 3.5 MPa. A motor speed of 1000 rpm was maintained throughout the experiment to achieve thorough mixing of catalyst, feedstock and hydrogen. The liquid product samples collected over different reaction times were immediately rinsed with cadmium chloride to remove the dissolved hydrogen sulfide before they are analyzed for sulfur content by using chemiluminescence technique using Antek 9000 system. Experimental conditions and sulfur content of products are presented in Table 1.

The results indicate that the simulated feed containing 1,000 ppm of sulfur in the form of thiophene was almost completely desulfurized in the presence of SCoMo1 catalyst. Within min, the sulfur content in the product was reduced to 63 ppm and was <10 ppm in 30 min With dibenzothiophene as a model sulfur compound in feedstock, the product sulfur from the test with conventional catalyst was reduced to 815 ppm in 3 h. The SCoMo1 catalyst exhibited much higher activity and the product sulfur content was reduced to 820 ppm within the first 15 min and to 333 ppm in 3 h. It should be noted that the test with SCoMo1 catalyst was performed with 0.2 g as compared to 0.5 g with the reference catalyst.

TABLE 1

Experimental conditions and results

| Catalyst | Feed | S in Feed (ppm) | Product Sulfur (ppm) after x mins | | | | | | | |
|---|---|---|---|---|---|---|---|---|---|---|
| | | | 15 | 30 | 45 | 60 | 90 | 120 | 150 | 180 |
| Conventional (0.5 g) | Decalin (49.87 g) + Thiophene (0.13 g) | 1,000 | 453 | 357 | 285 | 214 | 70 | 44 | — | — |
| SCoMo1 (0.2 g) | Decalin (49.87 g) + Thiophene (0.13 g) | 1,000 | 63 | <10 | <10 | <10 | <10 | <10 | — | — |
| Conventional (0.5 g) | Decalin (49.71 g) + Dibenzothiophene (0.29 g) | 1,000 | 1,000 | 1,000 | 990 | 980 | 910 | 850 | 830 | 815 |
| SCoMo1 (<0.2 g) | Decalin (49.71 g) + Dibenzothiophene (0.29 g) | 1,000 | 820 | 750 | 730 | 685 | 665 | 575 | 490 | 333 |

Example 3

Seven Mo nanocatalysts (without or with Co as promoter) were prepared by laser pyrolysis technique. A description of nanocatalysts is provided in Table 2.

TABLE 2

Description of nanocatalysts

| Code | Precursors | F MET (nm) | DRX Phase | Remarks |
|---|---|---|---|---|
| OMo2 | Mo Pentanedionate + ethanol | 8.9 | $MoO_2$ | No Cobalt, no S |
| OMo5 | Mo Pentanedionate + ethanol | | $MoO_2$ | No Cobalt, no S |
| OMoCo1 | Mo Pentanedionate + ethanol + Co | | $MoO_2$ | Co 5%, no S |
| OMoCo2 | Mo Pentanedionate + ethanol + Co | 7.9 | $MoO_2$ | Co 10%, no S |
| OMoCo4 | Mo Pentanedionate + ethanol + Co | 6.7 | $MoO_2$ | Co 5%, no S |
| SMo10 | Mo Pentanedionate + ethanol + thiouric acid | 4.5 | Amorphous | No Co |

TABLE 2-continued

Description of nanocatalysts

| Code | Precursors | F MET (nm) | DRX Phase | Remarks |
|---|---|---|---|---|
| SMo1 | Mo Pentanedionate + ethanol + thiouric acid | 4.6 | Amorphous | No Co |

All the catalysts listed in Table 2 (except SMo10 and SMo11) were synthesized in oxide form. They were pre-sulfided prior to activity testing. On a micro-scale, the pre-sulfiding of 100-200 mg of catalyst was carried out by flowing a $H_2+H_2S$ gas mixture (containing 1-5 mol % $H_2S$ in $H_2$). The catalyst was heated to 300-350° C. at 30° C./h and maintained at 300-350° C. for 2-6 hours to complete the pre-sulfiding.

A small-scale batch autoclave reactor, as described in Example 1, was used for the preliminary HDS test. A 50 g model feedstock was prepared by adding 0.29 g of dibenzothiophene in 49.71 g of decalin so as to have a sulfur content of 1,000 ppm. Product samples were collected at 60 and 120 min intervals and were analyzed for their sulfur contents.

The results, presented in Table 3, indicate that in contrast to the reference catalyst, all the nanocatalysts exhibited higher activity. The sulfur contents in the products were 642 to 933 ppm after one hour and 575 to 812 ppm after 2 h. Among the nanocatalysts tested, OMo2 and SCoMo1 performed better than others.

TABLE 3

Experimental results using DBT as model sulfur compound

| Catalyst | S in Feed (PPM) | Product Sulfur (ppm) after x mins | |
|---|---|---|---|
| | | 60 | 120 |
| Conventional | 1,000 | 980 | 850 |
| OMo2 | 1,000 | 642 | 627 |
| OMo5 | 1,000 | 867 | 812 |
| OMoCo1 | 1,000 | 797 | 735 |
| OMoCo2 | 1,000 | 861 | 778 |
| OMoCo4 | 1,000 | 642 | 627 |
| SMo10 | 1,000 | 789 | 644 |
| SMo1 | 1,000 | 685 | 575 |

Example 4

A nano-catalyst (OMoCo8) containing Co was prepared by Laser Pyrolysis. Since earlier formulations of similar nanocatalysts were found to possess significantly higher activity than the conventional $CoMo/Al_2O_3$ catalyst, the flow reactor experiments were carried out using gas oil (diesel) as feedstock. The tubular reactor has an ID of 1.5 cm and length of 74 cm. It is heated by a three-zone furnace. Catalyst volume loaded in the reactor was 10 ml. Only those catalyst pellets with the sizes between 0.50 and 0.85 mm were used for packing. It was diluted in 1:1 ratio with silicon carbide (100 mesh). The reactor was operated in a once-through down-flow mode to determine the catalyst's performance in terms of activity.

For application of the nanocatalysts in a continuous flow reactor system, a liquid-based pre-sulfiding procedure, using white kerosene spiked with dimethyl disulfide (DMDS), was used. The sulfur content of the spiked feed was 2-3 wt %. During the pre-sulfiding, the flow rate of spiked feed was kept at LHSV of 1-4 under hydrogen pressure of 4-8 MPa and the $H_2$/oil at 100-300 $Nm^3/m^3$ and the temperature was increased from room temperature to 300-350° C. at a rate of about 25° C./hour. These conditions were maintained overnight (16 hours) to ensure complete pre-sulfiding. The feedstock is then switched to petroleum fraction to start the actual evaluation test.

After pre-sulfiding of the catalyst, the process conditions are changed to those of activity test. The catalyst is super-active in the beginning. To avoid premature coking, the first test condition was carried out at lowest test severity (low temperature and high pressure). For every next adjustment of the test temperature to a higher level, the maximum rate of temperature increase was kept at 5° C./hour, to avoid premature coking of the catalyst.

A typical run was carried out at constant conditions for a period of 48-72 hours. Liquid product samples were collected over a period of 3-4 hours and analyzed. The "hydrodesulfurized" products from the reactor contained dissolved hydrogen sulfide, which was removed by stripping it with flowing nitrogen (10 NL/h) through a sintered metal injector in a specially designed stripper. Total sulfur in the feedstock and the hydrotreated products was determined using a Antek sulfur analyzer.

The feedstock used was light gas oil obtained from distillation of Arabian medium crude oil (AM-LGO). The sulfur content of the AM-LGO was 1.0 wt %. The boiling range of the AM-LGO was between 180° C. and 357° C. with the mid-boiling point being 277° C. Its density was 0.822 g/ml.

Catalyst performance was evaluated by conducting micro-flow reactor experimental runs with a catalyst volume of 10 ml. The fixed operating conditions were 6 MPa hydrogen pressure, 1 $h^{-1}$ LHSV, and hydrogen-to-oil ratio of 250 NL/L. The variable condition was the temperature (320, 340, and 360° C.). Process conditions are presented in Table 4.

TABLE 4

Process conditions for performance evaluation tests
Process Conditions

| Feedstock | | Light Gas Oil from Arabian Medium crude (AM-LGO) |
|---|---|---|
| Feedstock Sulfur Content | ppm wt. | 10,000 |
| Catalyst Volume | Ml | 10 |
| Reactor Temperature | ° C. | 320, 340, 360 |
| Liquid Hourly Space Velocity | 1/hr | 1.0 |
| Reactor Pressure | MPa | 6 |
| Hydrogen/Oil Ratio | NL/L | 250 |
| Feed Flow Rate | ml/h | 10 |
| Hydrogen Flow Rate | NL/h | 2.5 |

The experimental results of OMoCo8 are compared with the reference $CoMo/Al_2O_3$ and presented in Table 5. The results indicate that the sulfur contents in hydrodesulfurized products obtained over OMoCo8 were 30, 25, and 22 ppm at 320, 340 and 360° C., respectively. These values are significantly lower than the sulfur contents in product obtained over reference CoMo/Al$_2$O$_3$ catalyst which were 480, 160, and 36 ppm at 320, 340 and 360° C., respectively.

Comparison of the HDS rate constants at 320° C. indicates that OMoCo8 catalyst was about five (5) times more active than the conventional catalyst. Due to the very high activity of OMoCo8 catalyst, deep HDS was taking place at lower temperature of 320° C. Increase in reaction temperature to 340° C. and 360° C. did not cause exponential increase in HDS rates as generally observed for conventional catalysts. This was also reflected in very low activation energy for OMoCo8 catalyst compared to the conventional catalyst. However, the hydrogen consumption was quite high for OMoCo8 catalyst. This has resulted in higher H/C molar ratios in the product. The mid-boiling points of the products were lower than the feedstock by 23-27° C., which clearly indicate occurrence of hydrocracking.

TABLE 5

Performance evaluation results

| Catalyst Size: 500-850 microns | | Feed | Ref CoMo/Al$_2$O$_3$ | | | OMoCo8 | | |
|---|---|---|---|---|---|---|---|---|
| Reaction Temperature | ° C. | | 320 | 340 | 360 | 320 | 340 | 360 |
| Sulfur Content | ppm wt. | 10,000 | 480 | 160 | 36 | 30 | 25 | 22 |
| Hydrodesulfurization | wt % | | 95.2 | 98.4 | 99.6 | 99.7 | 99.8 | 99.8 |
| Hydrogen Consumption | NL/L | | 46.2 | 58.3 | 71.6 | 85.8 | 92.0 | 96.2 |
| H/C molar ratio | | 1.690 | | | | 1.786 | 1.810 | 1.821 |
| Mid boiling point | ° C. | 277.1 | 275.6 | 274.0 | 272.3 | 254.4 | 251.6 | 250.2 |
| Rate Constant (1.5 order) | | | 7.1 | 13.8 | 31.3 | 34.5 | 38.0 | 40.6 |
| Activation Energy | kcal/mol | | | 27.7 | | | 3.0 | |

The invention claimed is:

1. A process for synthesizing an unsupported molybdenum sulfide nanocatalyst, comprising:
    atomizing a molybdenum oxide solution comprising at least one molybdenum precursor to form a molybdenum oxide aerosol;
    pyrolyzing the molybdenum oxide aerosol with a laser beam having a wavelength of 1.0-30.0 μm, a laser beam power up to 1.2 kW, and a focal length intensity of 1-10 kW/cm$^2$ to form an unsupported molybdenum-based nanocatalyst; and
    pre-sulfiding at least a portion of the unsupported molybdenum-based nanocatalyst to form an unsupported molybdenum sulfide nanocatalyst;
    wherein the molybdenum oxide aerosol is pyrolyzed in the presence of an inert carrier gas stream in a volumetric ratio of molybdenum oxide aerosol to the inert carrier gas stream ranging from 1:50 to 1:20; and
    wherein the unsupported molybdenum-based nanocatalyst, the unsupported molybdenum sulfide nanocatalyst or both are in the form of nanoparticles with a diameter of 1-10 nm and a distorted rutile crystalline structure.

2. The process of claim 1, wherein the at least one molybdenum precursor is molybdenum(IV) oxide bis(2,4-pentadionate).

3. The process of claim 1, wherein the molybdenum oxide solution has a concentration of molybdenum ranging from 0.04-0.2 M.

4. The process of claim 1, wherein the molybdenum oxide solution further comprises a metal precursor comprising at least one metal selected from the group consisting of Co, Ni, and W, and
    the process forms an unsupported mixed metal sulfide nanocatalyst comprising molybdenum and the at least one metal selected from the group consisting of Co, Ni, and W, wherein the unsupported mixed metal sulfide nanocatalyst is in the form of nanoparticles with a diameter of 1-10 mu and a distorted rutile crystalline structure.

5. The process of claim 4, wherein the metal precursor is cobalt(II) acetylacetonate.

6. The process of claim 4, wherein the molybdenum oxide solution comprises 1-30 wt % of the at least one metal, relative to the total weight of the molybdenum oxide solution.

7. The process of claim 1, wherein the molybdenum oxide aerosol is pyrolyzed at a flow rate of 4-12 m/s.

8. The process of claim 1, wherein the molybdenum oxide aerosol further comprises at least one photosensitizer selected from the group consisting of NH$_3$, C$_2$H$_4$, SF$_6$, and O$_3$.

9. The process of claim 1, wherein the pre-sulfiding comprises:
    contacting a gaseous mixture with the unsupported molybdenum-based nanocatalyst at an activating temperature of 250-400° C. for 1-8 hrs to form the unsupported molybdenum sulfide nanocatalyst;
    wherein the gaseous mixture comprises H$_2$ and 1-10 mol % H$_2$S, relative to the total molar composition of the gaseous mixture.

10. The process of claim 1, wherein the pre-sulfiding comprises:
    contacting a spiked hydrocarbon mixture and hydrogen gas with the unsupported molybdenum-based nanocatalyst for 12-20 hrs at 250-400° C. to form the unsupported molybdenum sulfide nanocatalyst,
    wherein the spiked hydrocarbon mixture comprises 1-5% dimethyl disulfide by weight relative to the total weight of the spiked hydrocarbon mixture and a liquid hydrocarbon, and a pressure of the hydrogen gas ranges from 2-10 MPa.

11. A process for synthesizing an amorphous molybdenum sulfide nanocatalyst comprising:
    atomizing a molybdenum oxide solution comprising at least one molybdenum precursor and thiouric acid to form an amorphous molybdenum-based aerosol; and
    pyrolyzing the amorphous molybdenum-based aerosol with a laser beam having a wavelength of 1.0-30.0 μm, a laser beam power up to 1.2 kW, and a focal length intensity of 1-10 kW/cm$^2$ to form an amorphous molybdenum sulfide nanocatalyst, wherein the amorphous molybdenum sulfide nanocatalyst does not have a crystalline structure.

* * * * *

UNITED STATES PATENT AND TRADEMARK OFFICE
CERTIFICATE OF CORRECTION

PATENT NO. : 10,023,813 B2
APPLICATION NO. : 15/190435
DATED : July 17, 2018
INVENTOR(S) : Zain Hassan Yamani et al.

It is certified that error appears in the above-identified patent and that said Letters Patent is hereby corrected as shown below:

In the Specification

Column 1, Lines 7-12 should be removed

Signed and Sealed this
Eleventh Day of June, 2019

Andrei Iancu
*Director of the United States Patent and Trademark Office*